(12) United States Patent
Ikemoto

(10) Patent No.: US 7,634,161 B2
(45) Date of Patent: Dec. 15, 2009

(54) THREE-DIMENSIONAL PERIODIC STRUCTURE INCLUDING ANTI-REFLECTION STRUCTURE AND LIGHT-EMITTING DEVICE

(75) Inventor: Kiyokatsu Ikemoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/401,148

(22) Filed: Mar. 10, 2009

(65) Prior Publication Data

US 2009/0232444 A1 Sep. 17, 2009

(30) Foreign Application Priority Data

Mar. 14, 2008 (JP) .............................. 2008-065648

(51) Int. Cl.
*G02B 6/26* (2006.01)
*G02B 6/42* (2006.01)
(52) U.S. Cl. ............................ 385/28; 385/14; 385/129
(58) Field of Classification Search .................. 385/14, 385/27–28, 39, 129–130
See application file for complete search history.

(56) References Cited

U.S. PATENT DOCUMENTS

| 6,879,766 B2 | 4/2005 | Tomaru |
| 6,931,189 B2 | 8/2005 | Lee et al. |
| 7,242,837 B2 * | 7/2007 | Talneau et al. ............... 385/129 |

FOREIGN PATENT DOCUMENTS

| JP | 2003-270458 | 9/2003 |
| JP | 2003-315572 | 11/2003 |

OTHER PUBLICATIONS

Stefano Boscolo, et al.; "Numerical Analysis of Propagation and Impedance Matching in 2-D Photonic Crystal Waveguides With Finite Length"; Feb. 2002; Journal of Lightwave Technology, vol. 20, No. 2; pp. 304-310.
Eli Yablonovitch; "Inhibited Spontaneous Emission in Solid-State Physics and Electronics"; May 18, 1987; Physical Review Letters, vol. 58, No. 20; pp. 2059-2062.

* cited by examiner

*Primary Examiner*—Frank G Font
*Assistant Examiner*—Michael P Mooney
(74) *Attorney, Agent, or Firm*—Fitzpatrick, Cella, Harper & Scinto

(57) ABSTRACT

The three-dimensional structure includes first and second waveguides, a resonator, a first region. The waveguides cause light to propagate therein in a first guide mode. The second waveguide and the first region are mutually connected such that at least part of the light propagating in the second waveguide is coupled with light propagating in the first region in a guide mode different from the first guide mode. Light present in the resonator is coupled with the lights respectively propagating in the waveguides. A condition of $-1 \leq \cos(\phi) < 0$ is satisfied, where $\phi$ represents a phase difference between one of first and second lights whose intensity is higher than that of the other and third light. The first light is light reflected at a connection region between the first waveguide and the resonator. The second and third lights are lights coupled with the light present in the resonator and propagate in the waveguides.

4 Claims, 10 Drawing Sheets

1

THREE-DIMENSIONAL PERIODIC STRUCTURE INCLUDING ANTI-REFLECTION STRUCTURE AND LIGHT-EMITTING DEVICE

BACKGROUND OF THE INVENTION

The present invention relates to a three-dimensional structure which includes an anti-reflection structure in a three-dimensional photonic crystal having a three-dimensional periodic structure, and a light-emitting device using the same.

Yablonovitch has suggested in "Physical Review Letters, Vol. 58, pp. 2059, 1987" that a periodic structure called a photonic crystal having a period equal to or shorter than an incident wavelength enables control of transmission and reflection characteristics of light as an electromagnetic wave.

Use of the photonic crystal having a so-called photonic band gap enables realization of an optical element having a new function. For example, a point defect or a line defect provided in the photonic crystal serves as a resonator or a waveguide.

When the line defect serving as the waveguide is provided in the photonic crystal, light propagates therein in a state of having a unique electromagnetic energy distribution according to a structure of the waveguide. Outside the photonic crystal, light propagates in a state of having a unique electromagnetic energy distribution according to a structure of the outside.

Hereinafter, the state of the light propagating with a unique electromagnetic energy distribution is referred to as a guide mode of the light. Further, a unique electromagnetic energy distribution in a certain guide mode is referred to as a guide mode pattern. A waveguide in the photonic crystal is referred to as a waveguide 1, and a guide mode of light propagating in the waveguide 1 is referred to as a guide mode 1.

The light of the guide mode 1 propagating in the waveguide 1 in the photonic crystal is coupled with light propagating in a guide mode (guide mode 2) different from the guide mode 1, in other words, the light of the guide mode 1 is made usable by converting the guide mode. Hereinafter, a rate at which at least part of energy of the light propagating in the guide mode 1 is converted into energy of the light propagating in the guide mode 2 when the light propagating in the guide mode 1 is coupled with the light propagating in the guide mode 2 is referred to as coupling efficiency.

When the waveguide 1 in the photonic crystal is connected with a structure in which light propagates in the guide mode 2, part of the light propagating in the waveguide 1 in the guide mode 1 is coupled with the light propagating in the guide mode 2. Further, part of the light propagating in the guide mode 1 becomes a reflected wave to propagate in the waveguide 1.

In order to convert the light propagating in the guide mode 1 into the light propagating in the guide mode 2 to use the converted light efficiently, improvement of the coupling efficiency between the light propagating in the guide mode 1 and the light propagating in the guide mode 2 and reduction of the reflected wave propagating in the waveguide 1 are required.

To meet such requirements, Japanese Patent Laid-Open No. 2003-315572 discloses an example in which a waveguide 2 as a tapered defect is formed between a waveguide 1 and a free space in a photonic crystal by gradually increasing a width of a line defect. A guide mode of light propagating in the free space is referred to as a guide mode 2, while a guide mode of light propagating in the waveguide 2 formed by the tapered defect is referred to as a guide mode 3.

In Japanese Patent Laid-Open No. 2003-315572, connecting the waveguide 2 with the waveguide 1 and the free space causes the light of the guide mode 1 propagating in the waveguide 1 to be converted into light of the guide mode 3 having a pattern shape similar to that of the guide mode 2, thereby causing the light of the guide mode 3 to be coupled with the light of the guide mode 2. Thus, the coupling efficiency between the light propagating in the waveguide 1 in the guide mode 1 and the light propagating in the free space in the guide mode 2 can be improved, and a reflected wave propagating in the waveguide 1 can be reduced.

Further, Japanese Patent Laid-Open No. 2003-270458 discloses a structure in which, between two waveguides having guide modes different from each other, a third waveguide is provided which has a guide mode different from the guide modes of the two waveguides. Specifically, the structure includes between a waveguide 1 provided in a photonic crystal and a waveguide 2 provided outside the photonic crystal the third waveguide (waveguide 3) whose structure is different from that of the waveguide 1. The guide mode of light propagating in the waveguide 2 is a guide mode 2, while the guide mode of light propagating in the waveguide 3 is a guide mode 3. Part of light propagating in the waveguide 1 becomes a reflected wave at a connection portion of the waveguides 1 and 3 due to the difference of the guide modes 1 and 3. Part of light propagating in the waveguide 3 becomes a reflected wave at a connection portion of the waveguides 2 and 3 due to the difference of the guide modes 2 and 3.

Japanese Patent Laid-Open No. 2003-270458 discloses that interference of these two reflected waves reduces the reflected wave propagating in the waveguide 1, thereby improving the coupling efficiency between the light propagating in the waveguide 1 in the guide mode 1 and the light propagating in the waveguide 2 in the guide mode 2.

In the structure disclosed in Japanese Patent Laid-Open No. 2003-315572, the guide mode 1 of the light propagating in the waveguide 1 in the photonic crystal and the guide mode 3 of the light propagating in the waveguide 2 formed by the tapered defect are mutually different guide modes. Therefore, connection of the waveguides 1 and 2 causes part of the light propagating in the waveguide 1 in the guide mode 1 to become a reflected wave. This reflected wave is a loss since it is not coupled with the light propagating in the guide mode 3. In other words, in the connection portion of the waveguides 1 and 2, part of the light propagating in the guide mode 1 cannot be suppressed from becoming the reflected wave.

BRIEF SUMMARY OF THE INVENTION

The present invention provides a three-dimensional structure which suppresses generation of a reflected wave in a connection portion by using an easily manufactured structure to improve coupling efficiency when a waveguide in a three-dimensional photonic crystal is connected with a region where light propagating in a guide mode different from a guide mode in the waveguide. The present invention also provides a light-emitting device which uses the three-dimensional structure.

The present invention provides as one aspect thereof a three-dimensional structure constituted with a three-dimensional photonic crystal. The three-dimensional structure includes a first waveguide and a second waveguide which are respectively formed by providing line defects in the three-dimensional photonic crystal, a resonator which is formed by providing a point defect in the three-dimensional photonic crystal, and a first region which causes light to propagate in a guide mode different from a guide mode in which the first and second waveguides cause light to propagate therein. The first waveguide includes an input portion into which light enters. The first and second waveguides cause the light to propagate therein in a first guide mode. The second waveguide and the first region are connected with each other such that at least part of the light propagating in the second waveguide is coupled with the light propagating in the first region. The resonator is provided such that at least part of light present in the resonator is coupled with the light propagating in each of the first and second waveguides. Of the light propagating in the first waveguide toward the resonator, light which is reflected at a connection portion of the first waveguide and the resonator is defined as first light, light which is coupled with the light present in the resonator and then coupled again with the light propagating in the first waveguide is defined as second light, and light which is coupled with the light present in the resonator, then coupled with the light propagating in the second waveguide, then coupled again with the light present in the resonator, and then coupled with the light propagating in the first waveguide is defined as third light. The resonator and the first and second waveguides are formed such that intensity of the first light and intensity of the second light are different from each other. The resonator and the first and second waveguides are formed so as to satisfy the following condition:

$$-1 \leq \cos(\phi) < 0$$

where $\phi$ represents a phase difference between one of the first light and the second light whose intensity is higher than that of the other, and the third light.

The present invention provides as another aspect thereof a light-emitting device including the above three-dimensional structure, a light-emitting resonator including a gain medium and disposed in the three-dimensional photonic crystal, and a second region disposed outside the three-dimensional photonic crystal. The light-emitting resonator and the first waveguide in the three-dimensional structure are disposed such that at least part of light present in the light-emitting resonator is coupled with the light propagating in the first waveguide. The first region and the second region are disposed such that at least part of the light propagating in the first region is coupled with light propagating in the second region in a guide mode different from the second guide mode. Light generated in the light-emitting resonator by exciting the gain medium propagates in the first waveguide, the second waveguide and the first region to be output to the second region.

Other aspects of the present invention will be apparent from the embodiments described below with reference to the drawings.

DETAILED DESCRIPTION OF THE EMBODIMENTS

Exemplary embodiments of the present invention will be described below with reference to the accompanied drawings.

Embodiment 1

Figure 1:
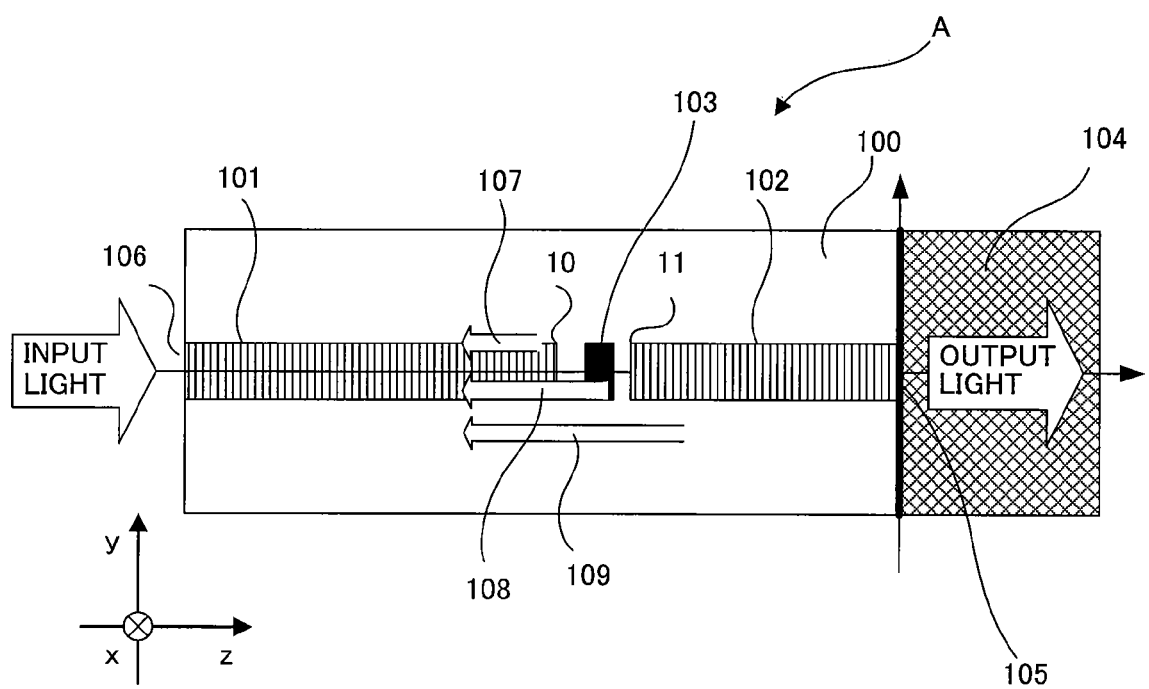
FIG. 1 shows a schematic configuration of a three-dimensional structure which is Embodiment 1 of the present invention.

Description will be made of a three-dimensional structure that is a first embodiment (Embodiment 1) of the present invention with reference to FIG. 1. FIG. 1 shows a schematic configuration of a three-dimensional structure A including an anti-reflection structure.

Embodiment 1 describes an anti-reflection principle of the three-dimensional structure which is common to other embodiments described below.

The three-dimensional structure A includes a waveguide (first waveguide) 101, a waveguide (second waveguide) 102, and a resonator 103 in a three-dimensional photonic crystal (hereinafter simply referred to as a photonic crystal) 100. The three-dimensional structure A further includes an output region which is a first region 104.

The photonic crystal 100 has a structure having a three-dimensional periodic refractive index distribution, in other words, a structure where a first medium and a second medium having a refractive index lower than that of the first medium are periodically arranged, and has a photonic band gap. Specifically, the photonic crystal 100 includes, as described in Embodiments 2 and therebelow, plural columnar structure portions formed of the first medium and portions formed of the second medium such as air.

The waveguide 101 is a structure obtained by providing in the photonic crystal 100 a line defect formed of a third medium having a refractive index equal to or higher than that of the first medium. The provision of the line defect in the photonic crystal 100 enables production of a state where light in a partial frequency band of light in frequency bands included in the photonic band gap of the photonic crystal 100 can exist in the line defect. Further, the provision of the line defect in the photonic crystal 100 causes light to propagate in the line defect in a direction in which the line defect extends (hereinafter referred to as "extending direction of the line defect"). The light propagating in the line defect has a unique electromagnetic energy distribution according to the structure of the photonic crystal or the structure of the line defect. A guide mode of the light propagating in the waveguide 101 is defined as a guide mode 1 (first guide mode).

The guide mode means a state of light propagating with a unique electromagnetic energy distribution, which is determined by a structure of a waveguide in which the light propagates. A unique electromagnetic energy distribution in a certain guide mode is referred to as a guide mode pattern. A frequency of light propagating with a unique electromagnetic energy distribution is referred to as a guide mode frequency.

The waveguide 102 is a structure obtained by providing a line defect in the photonic crystal 100, as is the waveguide 101. The waveguide 102 is formed of, as the waveguide 101, the third medium having a refractive index equal to or higher than that of the first medium.

In the waveguide 102, light propagates in a guide mode which is the same as the guide mode of the light propagating in the waveguide 101. Further, the waveguide 101 has an end portion 10 in the photonic crystal 100, and the waveguide 102 has an end portion 11 in the photonic crystal 100.

The resonator 103 has a structure obtained by providing a point defect in the photonic crystal 100. The provision of the point defect in the photonic crystal 100 enables production of a state where light in a partial frequency band of light in frequency bands included in the photonic band gap of the photonic crystal 100 can exist in the point defect. Further, the provision of the point defect in the photonic crystal 100 localizes light in the point defect. The light localized (present) in the point defect has a unique electromagnetic energy distribution according to the structure of the photonic crystal or the structure of the point defect. A localization mode of light localized in the resonator 103 is referred to as a localization mode 1.

The resonator 103 is disposed between the waveguides 101 and 102 (between end portions 10 and 11). The resonator 103 is disposed such that at least part of light present in the resonator 103 is coupled with light propagating in the waveguides 101 and 102.

A rate at which at least part of energy of the light present in the resonator 103 is converted into energy of light propagating in the waveguide per unit time is defined as a coupling constant. A coupling constant between the light present in the resonator 103 and the light propagating in the waveguide 101 is defined as a first coupling constant. A coupling constant between the light present in the resonator 103 and the light propagating in the waveguide 102 is defined as a second coupling constant. A ratio of the first coupling constant to the second coupling constant, in other words, a value obtained by dividing the first coupling constant by the second coupling constant is defined as a coupling constant ratio. The resonator 103 is disposed such that the coupling constant ratio is a value other than 1.

The output region 104 has a structure different from that of the waveguide 102. That is, the output region 104 is a waveguide where light propagating therein in a guide mode different from that in the waveguide 101.

The output region 104 causes the light to propagate therein in a guide mode different from the guide mode 1 of the light propagating in the waveguide 102. The output region 104 can be formed by, for example, providing a defect different from the waveguide 101 in the photonic crystal 100. The output region 104 also can be formed by using a three-dimensional structure different from the photonic crystal 100. Further, the output region 104 may be a region where a medium such as air is spatially homogeneously distributed, or a region where a thin line waveguide is provided. The guide mode of the light propagating in the output region 104 is defined as a guide mode 2 (second guide mode).

The output region 104 may be a region including at least one waveguide whose position is different from that of the waveguide 101 in a section orthogonal to an extending direction of the waveguide 101. The waveguide included in the output region 104 may be a waveguide formed by a line defect extending in a direction different from the extending direction of the line defect included in the waveguide 101.

The guide mode frequency of the light propagating in the waveguide 101 and the guide mode frequency of the light propagating in the output region 104 include a same frequency band at least in parts thereof. The waveguide 102 and the output region 104 are connected with each other via a connection region (connection portion) 105.

In description below, a direction in which a waveguide (line defect) extends or a direction in which light propagates is referred to as a guide direction (or a propagation direction).

In the three-dimensional structure A shown in FIG. 1, input light entering from an input portion 106 propagates in the waveguide 101 toward the resonator 103 in the guide mode 1.

When the light propagating in the waveguide 101 reaches the end portion 10 thereof, its guide mode pattern is disturbed. When the end portion 10 disturbs the guide mode pattern of the light propagating in the waveguide 101, part of that light is coupled with light propagating in the waveguide 101 in the guide mode 1 toward the input portion 106, and the other part of that light is coupled with light present in the resonator 103 in the localization mode 1. That is, the part of the light propagating in the waveguide 101 is reflected by the end portion 10 of the waveguide 101. The light reflected by the end portion 10 of the waveguide 101 in this way is referred to as a reflected wave (first light) 107.

Intensity of the reflective wave 107 can be controlled by changing a shape of the end portion 10 of the waveguide 101, a relative positional relationship between the waveguide 101 and the resonator 103, or a shape, a medium or a position of the resonator 103.

Part of the light entering from the input portion 106 to propagate in the waveguide 101 and be coupled with the light present in the resonator 103 is coupled again with the light propagating in the waveguide 101 toward the input portion 106 to propagate in the waveguide 101 toward the input portion 106. The light propagating in the waveguide 101 toward the input portion 106 is referred to as a reflected wave (second light) 108.

Further, another part of the light entering from the input portion 106 to propagate in the waveguide 101 and be coupled with the light present in the resonator 103 is coupled with the light propagating in the waveguide 102 in the guide mode 1 to propagate in the waveguide 102 toward the connection region 105. The light propagating toward the connection region 105 passes therethrough and then is coupled with the light propagating in the output region 104 in the guide mode 2.

The guide mode 1 of the light propagating in the waveguide 102 and the guide mode 2 of the light propagating in the output region 104 are mutually different guide modes. Thus, part of the light that has reached the connection region 105 is coupled with the light propagating in the waveguide 102 toward the resonator 103. In other words, the part of the light that has reached the connection region 105 is reflected by the connection region 105.

The reflected light propagates in the waveguide 102 and repeats reflection at the end portion 11 thereof, propagation in the waveguide 102 and reflection at the connection region 105. Part of the light propagating while repeating the reflections at the end portion 11 of the waveguide 102 and the connection region 105 is coupled with the light present in the resonator 103, and then coupled with the light propagating in the waveguide 101 toward the input portion 106. The light propagating toward the input portion 106 is referred to as a reflected wave (third light) 109.

The reflected waves 107, 108 and 109 mutually interfere to become light propagating in the waveguide 101 toward the input portion 106 to return thereto. This light is not output to the output region 104 but becomes a loss. In description below, light which is part of the input light entering from the input portion 106 and is not output to the output region 104 but returns to the input portion 106 to become a loss is referred to as returning light.

Appropriate control of intensities and phases of the reflected waves 107, 108 and 109 enables control of the returning light.

A reason that the coupling constant ratio should be set to a value other than 1 to make the intensities of the reflected waves 107 and 108 different from each other will be described below.

When the coupling constant ratio is 1, the intensities of the reflected waves 107 and 108 are equal to each other. In this case, if the reflected waves 107 and 108 interfere with the reflected wave 109 in a state where the phases of the reflected waves 107, 108 and 109 are appropriately adjusted, the reflected waves 107 and 108 interfere with each other to cancel each other out, while the reflected wave 109 remains. The remaining reflected wave 109 becomes the returning light, so that the returning light cannot be reduced.

In contrast thereto when the coupling constant ratio is set smaller than 1, the intensity of the reflected wave 107 is higher than that of the reflected wave 108. In this case, if the reflected waves 107 and 108 interfere with each other, part of the reflected wave 107 remains. The remaining part of the reflected wave 107 interferes with the reflected wave 109 to cancel each other out, which results in reduction of the returning light.

When the coupling constant ratio is larger than 1, the intensity of the reflected wave 108 is higher than that of the reflected wave 107. In this case, if the reflected waves 107 and 108 interfere with each other, part of the reflected wave 108 remains. The remaining part of the reflected wave 108 interferes with the reflected wave 109 to cancel each other out, which results in reduction of the returning light.

When the coupling constant ratio is larger than 1, intensity of the light present in the resonator 103 is increased and thereby the intensities of the reflected waves 107, 108 and 109 with respect to changes in the shape, medium and position of the resonator 103 are significantly changed, which increases an influence of manufacturing errors. Accordingly, it is preferable that the coupling constant ratio be set to a value smaller than 1.

Thus, appropriately adjusting the coupling constant ratio to a value other than 1 enables setting of the intensities of the reflected waves 107, 108 and 109 to appropriate values, thereby reducing the returning light.

Next, a relationship of the phases of the reflected waves 107, 108 and 109 will be described. As described above, when the coupling constant ratio is smaller than 1, the intensity of the reflected wave 107 is higher than that of the reflected wave 108. Further, when the coupling constant ratio is larger than 1, the intensity of the reflected wave 108 is higher than that of the reflected wave 107.

In this case, interference of one of the reflected waves 107 and 108 whose intensity is higher than that of the other with the reflected wave 109 under a condition in which a phase difference therebetween is within a range of $\pi/2+2\pi n$ to $3\pi/2+2\pi n$ (n is an integer) reduces intensity of the returning light. Moreover, an appropriate adjustment of the reflected waves 107, 108 and 109 enables improvement of an effect of the interference, thereby reducing the intensity of the returning light. Thus, satisfying the following condition (1) enables suppression (reduction) of the returning light:

$$-1 \leq \cos(\phi) < 0 \qquad (1)$$

where $\phi$ denotes a phase difference between one of the reflected waves 107 and 108 whose intensity is higher than that of the other and the reflected wave 109.

A lower intensity of the returning light increases intensity of the light propagating in the waveguide 102 toward the connection region 105, resulting in a higher intensity of the light output to the output region 104. In other words, the coupling efficiency between the light propagating in the waveguide 101 in the guide mode 1 and the light propagating in the output region 104 in the guide mode 2 can be improved.

The phase of the reflected wave 107 can be controlled based on the shape of the end portion 10 of the waveguide 101. The phase of the reflected wave 108 can be controlled based on the shape, medium and the position of the resonator 103, and the relative positional relationship between the waveguide 101 and the resonator 103.

The phase of the reflected wave 109 can be controlled based on the shape, medium and position of the resonator 103, and the relative positional relationship between the waveguide 101 or the waveguide 102 and the resonator 103. The phase of the reflected wave 109 also can be controlled based on a shape of the end portion 11 of the waveguide 102, a medium forming the waveguide 102, and a length between the end portion 11 of the waveguide 102 and the connection region 105.

The first coupling constant, the second coupling constant, and the coupling constant ratio can be controlled based on the shape, medium and position of the resonator 103, and the relative positional relationship between the resonator 103 and the waveguide 101 or the waveguide 102.

When the values of the first and second coupling constants are small, coupling between the light propagating in the waveguides 101 and 102 or the light present in the resonator 103 and light propagating in a radiation mode is enlarged, which increases a loss. Thus, it is preferable that the values of the first and second coupling constants be large.

A rate at which at least part of the energy of the light present in the resonator 103 is converted into energy of the light propagating in the radiation mode per unit time is defined as a third coupling constant. It is preferable that the values of the first and second coupling constants be equal to or larger than ten times that of the third coupling constant.

Embodiment 2

Figure 2:
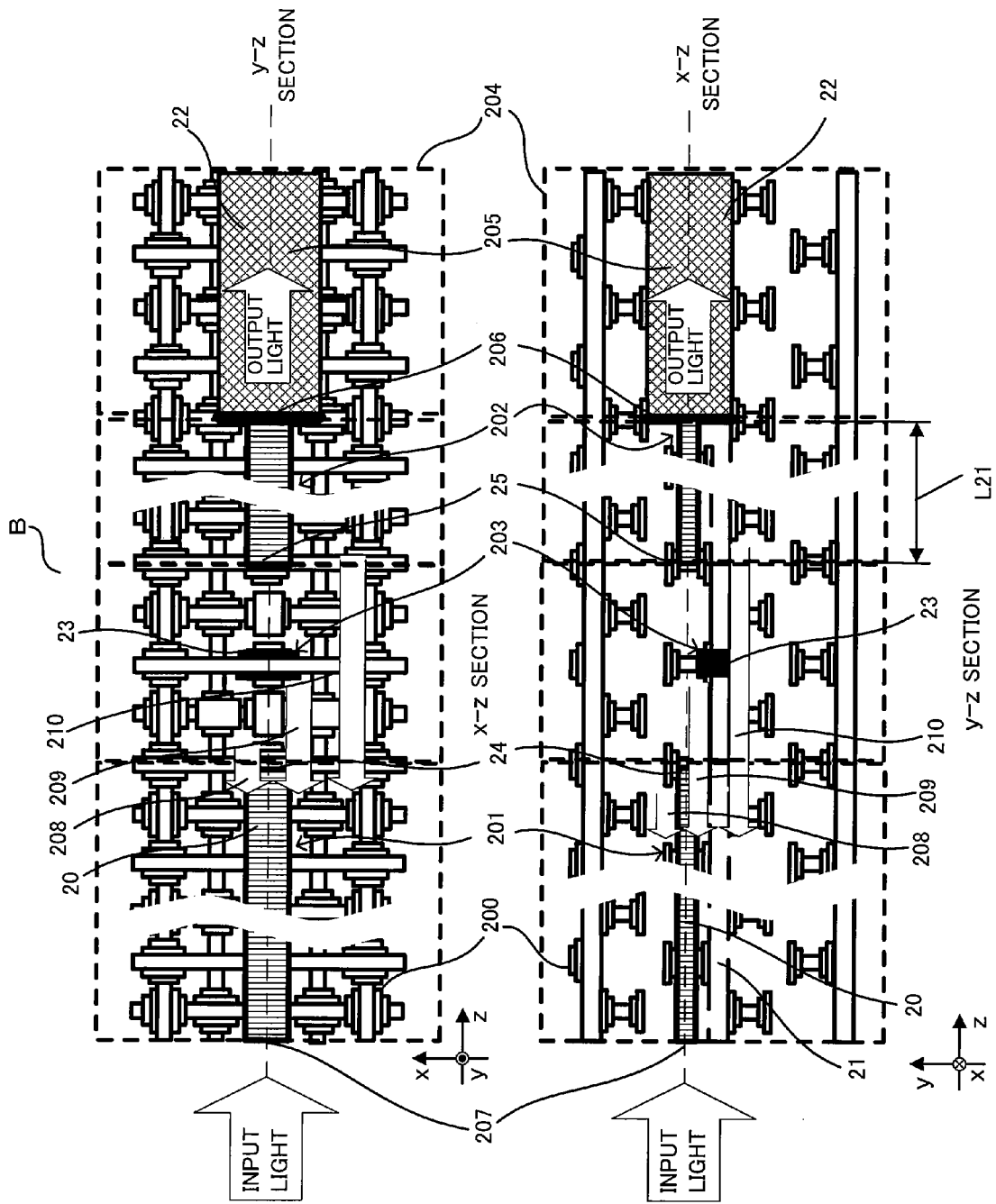
FIG. 2 shows a schematic configuration of a three-dimensional structure which is Embodiment 2 of the present invention.

FIG. 2 shows a schematic configuration of a three-dimensional structure B which is a second embodiment (Embodiment 2) of the present invention. The upper part in FIG. 2 shows an x-z section of the three-dimensional structure B, and the lower part therein shows a y-z section of the three-dimensional structure B.

The three-dimensional structure B includes in a photonic crystal 200 a waveguide (first waveguide) 201, a waveguide (second waveguide) 202, and a resonator 203.

The waveguide 201 is formed by providing a line defect in the photonic crystal 200. The waveguide 201 has an end portion 24 in the photonic crystal 200.

The waveguide 202 is formed by providing a line defect in the photonic crystal 200 as is the waveguide 201. The waveguide 202 has an end portion 25 in the photonic crystal 200.

The resonator 203 is formed by providing a point defect between the waveguides 201 and 202 (that is, between the end portions 24 and 25).

The three-dimensional structure B includes an output region 204 which is a first region. The output region 204 is a region including a waveguide 205 formed in the photonic crystal 200. The waveguide 205 is formed by providing a line defect in the photonic crystal 200.

The waveguides 202 and 205 have mutually different structures, and are connected to each other at a connection region (connection portion) 206.

Figure 3:
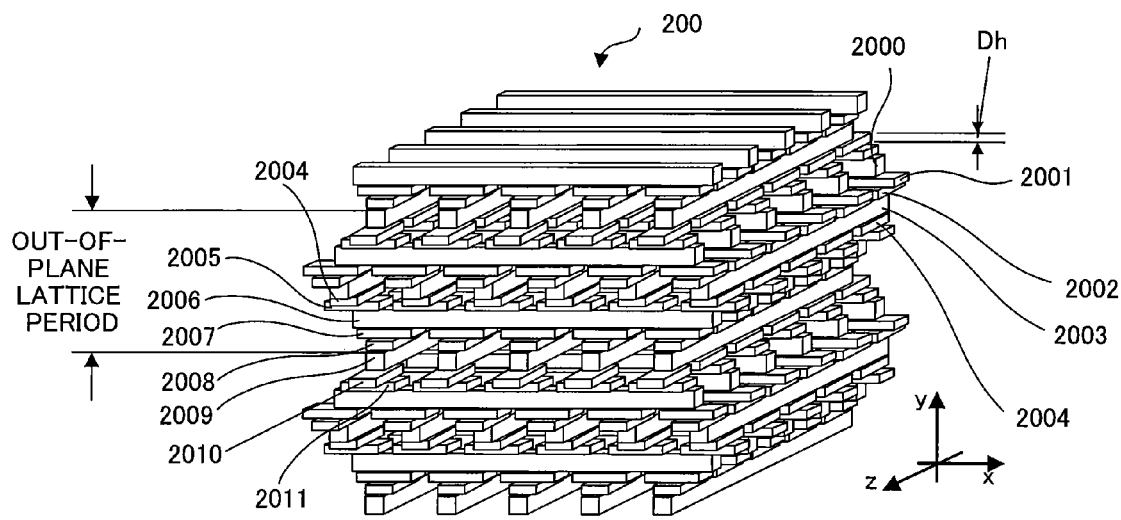
FIG. 3 is a perspective view showing a structure of a photonic crystal in Embodiment 2.

FIG. 3 shows a schematic structure of the photonic crystal 200 having a photonic band gap. The photonic crystal 200 is constructed based on a basic period of 12 layers 2000 to 2011 including an x-z plane.

Figure 4:
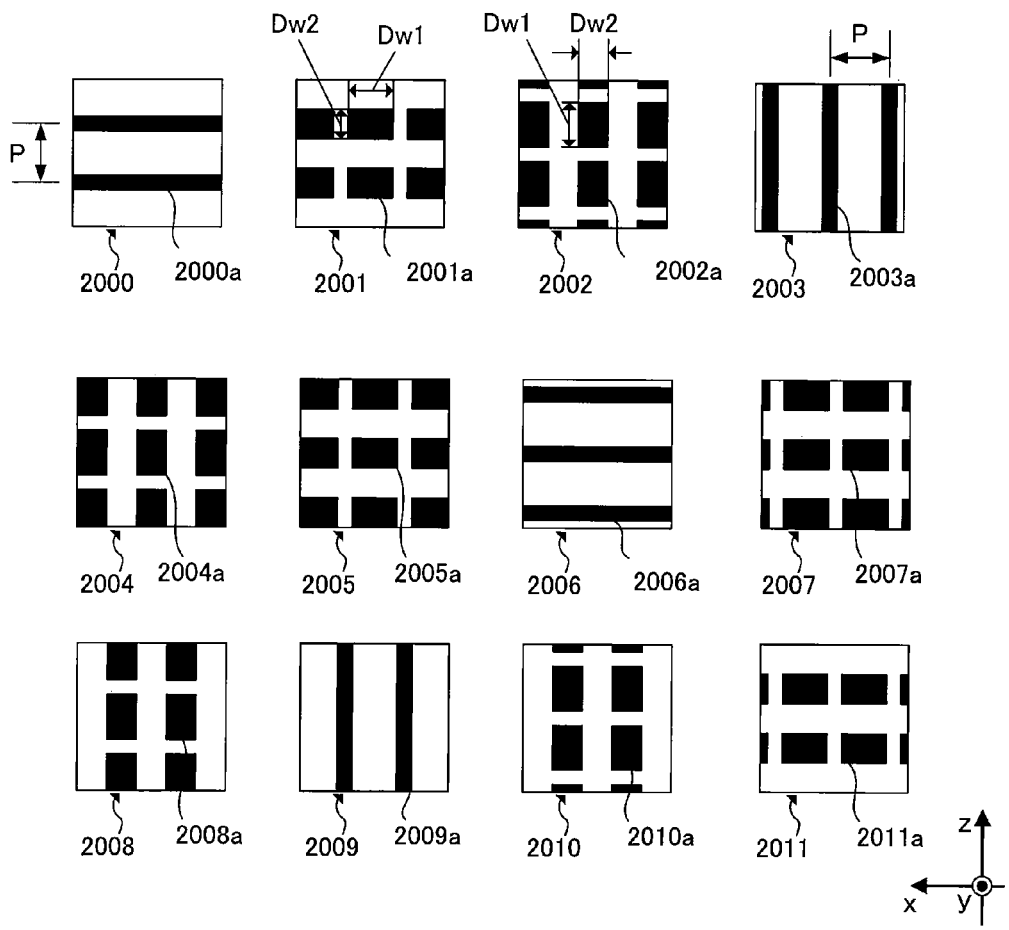
FIG. 4 is an x-z sectional view showing respective layers in the photonic crystal in Embodiment 2.

FIG. 4 shows part of an x-z section (viewed in a y-axis direction) of each of the layers 2000 to 2011. First and seventh layers 2000 and 2006 as columnar structure layers respectively include columnar structures (first columnar structures) 2000a and 2006a which extend in an x-axis direction (first direction) and are arranged at equal intervals (or period or pitch) P in a z-axis direction. The columnar structures 2000a and 2006a are shifted from each other by P/2 (half pitch) in the z-axis direction.

Fourth and tenth layers 2003 and 2009 as columnar structure layers respectively include columnar structures (second columnar structures) 2003a and 2009a which extend in the z-axis direction (second direction) orthogonal to the x-axis direction and are arranged at equal intervals (or period or pitch) P in the x-axis direction. The columnar structures 2003a and 2009a are shifted from each other by P/2 in the x-axis direction.

In other words, the photonic crystal 200 has a basic structure where the columnar structure layers (first and seventh layers) having the columnar structures extending in the x-axis direction and the columnar structure layers (fourth and tenth layers) having the columnar structures extending in the z-axis direction are alternately stacked.

Second and third layers 2001 and 2002 which are additional layers are disposed between the first and fourth layers 2000 and 2003 which are the columnar structure layers. The second and third layers 2001 and 2002 respectively include discrete structures (third structures) 2001a and 2002a arranged at positions corresponding to intersection points between the columnar structures 2000a and 2003a in the first and fourth layers 2000 and 2003 when viewed in the y-axis direction. In other words, each of the discrete structures 2001a and 2002a is disposed at a position where the columnar structure 2000a sterically intersects with the columnar structure 2003a.

The discrete structures 2001a and 2002a have a rectangular plate shape, respectively, and are discretely arranged so as not to contact each other in the x-z plane in the second and third layers 2001 and 2002.

The discrete structures 2001a and 2002a have rectangular plate shapes (symmetry) where one of them is rotated by 90° in the x-z plane to be stacked on the other.

Further, fifth and sixth layers 2004 and 2006, eighth and ninth layers 2007 and 2008, and eleventh and twelfth layers 2010 and 2011 as additional layers are respectively arranged between the fourth and seventh layers 2003 and 2006, between the seventh and tenth layers 2006 and 2009, and between the tenth layer 2009 and a first layer of a next basic period. The fifth and sixth layers 2004 and 2005, the eighth and ninth layers 2007 and 2008, and the eleventh and twelfth layers 2010 and 2011 are formed as is the second and third layers 2001 and 2002. In other words, discrete structures 2004a, 2005a, 2007a, 2008a, 2010a, and 2011a are arranged at positions corresponding to intersection points between the columnar structures in the columnar structure layers including the columnar structures extending in the directions orthogonal to each other when viewed in the y-axis direction.

As described above, the photonic crystal 200 is configured such that the first layer, the second layer, the third layer, and the fourth layer are stacked in this order. The first layer and the third layer respectively include the first structures which extend in the first direction and are periodically arranged in the second direction orthogonal to the first direction with gaps. The second layer and the fourth layer respectively include the second structures which extend in the second direction and are periodically arranged in the first direction with gaps.

The first structures included in the first layer and the first structures included in the third layer are arranged so as to shift from each other by the half pitch in the second direction. The second structures included in the second layer and the second structures included in the fourth layer are arranged so as to shift from each other by the half pitch in the first direction. The first and second structures are formed of a first medium.

Further, the additional layers are arranged between the first to fourth layers. Each additional layer includes at least one layer in which the third structures are discretely arranged in a plane parallel to the first to fourth layers. Each of the third structures is disposed at the position where the first structure sterically intersects with the second structure. The third structure is formed of the first medium which is the same medium as those of the first and second structures. Portions other than the first, second and third structures are formed of a second medium (such as air) whose refractive index is lower than that of the first medium.

In the columnar structure layer and the additional layer adjacent thereto, the columnar structure and the discrete structure are in contact with each other. Appropriate setting of structural parameters such as refractive indexes, shapes and intervals of materials forming the columnar structure and the discrete structure, and a thickness of each layer enables acquisition of a complete photonic band gap in a specific broad frequency band (wavelength band).

Providing a defect which disturbs the period in the photonic crystal 200 generates light of a defect mode having a frequency in the complete photonic band gap. The defect mode is a mode whose frequency (wavelength) and wave vector are determined based on a shape or a medium of the defect.

In the present embodiment, the waveguides 201 and the waveguide 205 are formed so as to have guide modes different from each other in the complete photonic band gap of the photonic crystal.

In the three-dimensional structure B, the waveguides 202 and 205 are connected with each other at the connection region 206. The center coordinate in the section of the line defect 20 forming the waveguide 202 orthogonal to the extending direction of the line defect 20 matches that in the section of the line defect 22 forming the waveguide 205 orthogonal to the extending direction of the line defect 22.

Figure 5A:
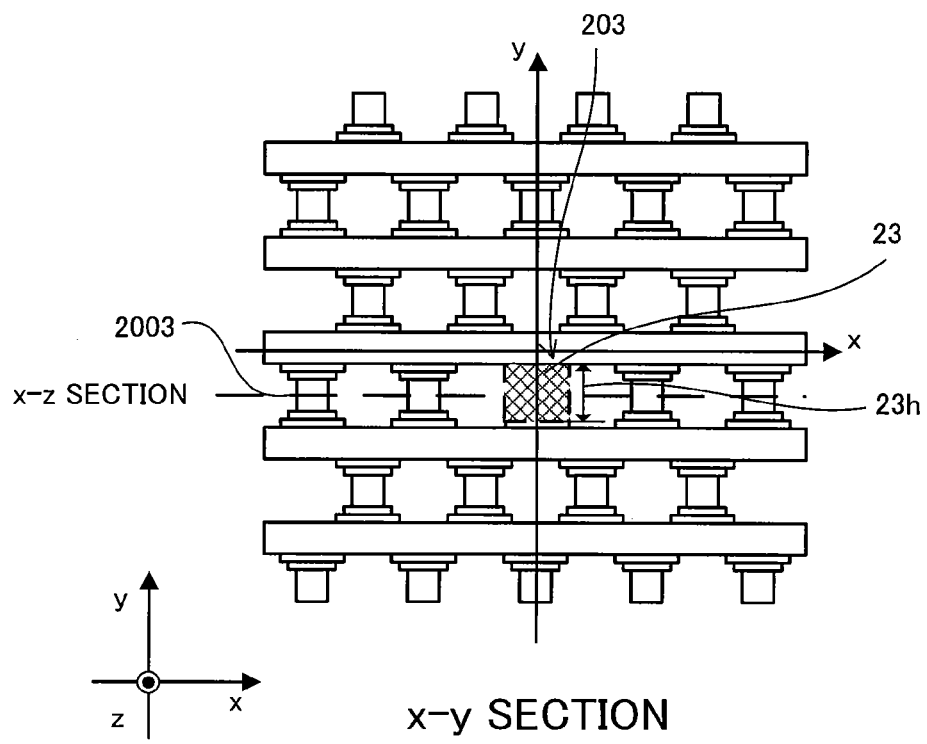
FIG. 5A is an x-y sectional view of a resonator in Embodiment 2.
Figure 5B:
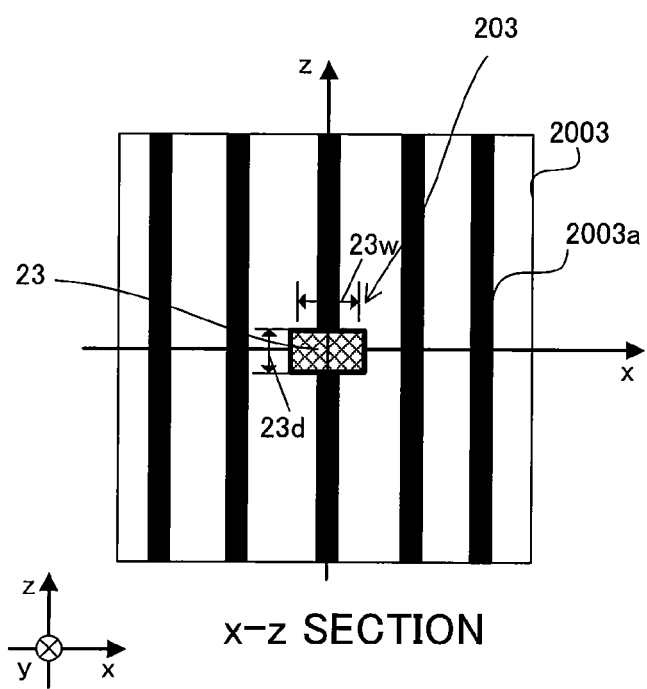
FIG. 5B is an x-z sectional view of the resonator in Embodiment 2.

The resonator 203 is formed by providing a point defect 23 in a layer including the columnar structures extending in the z-axis direction in the photonic crystal 200 shown in FIG. 3. FIGS. 5A and 5B show a schematic structure of the resonator 203. FIG. 5A shows an x-y section of the resonator 203, while FIG. 5B shows an x-z section of the resonator 203.

In FIG. 2, input light entering from the input portion 207 propagates in the waveguide 201 in the guide mode 1. As described in Embodiment 1, when the light propagating in the waveguide 201 reaches the end portion 24 thereof, its guide mode pattern is disturbed. When the end portion 24 disturbs the guide mode pattern of the light propagating in the waveguide 201, part of that light is coupled with light propagating in the waveguide 201 in the guide mode 1 toward the input portion 207, and another part of that light is coupled with light present in the resonator 203 in the localization mode 1. That is, the part of the light propagating in the waveguide 201 is reflected by the end portion 24 of the waveguide 201. The light reflected by the end portion 24 of the waveguide 201 is referred to as a reflected wave (first light) 208.

Intensity of the reflective wave 208 can be controlled by changing a shape of the end portion 24 of the waveguide 201, a relative positional relationship between the waveguide 201 and the resonator 203, or a shape, a medium or a position of the resonator 203.

Part of the light entering from the input portion 207 to propagate in the waveguide 201 and be coupled with the light present in the resonator 203 is coupled again with the light propagating in the waveguide 201 toward the input portion 207 to propagate in the waveguide 201 toward the input portion 207. The light propagating in the waveguide 201 toward the input portion 207 is referred to as a reflected wave (second light) 209.

Further, another part of the light entering from the input portion 207 to propagate in the waveguide 201 and be coupled with the light present in the resonator 203 is coupled with the light propagating in the waveguide 202 in the guide mode 1 to propagate in the waveguide 202 toward the connection region 206. The light propagating toward the connection region 206 passes therethrough and then is coupled with the light propagating in the output region 204 in the guide mode 2.

The guide mode 1 of the light propagating in the waveguide 202 and the guide mode 2 of the light propagating in the output region 204 are mutually different guide modes. Thus, part of the light that has reached the connection region 206 is coupled with the light propagating in the waveguide 202 toward the resonator 203. In other words, the part of the light that has reached the connection region 206 is reflected by the connection region 206.

The reflected light propagates in the waveguide 202 and repeats reflection at the end portion 25 thereof, propagation in the waveguide 202 and reflection at the connection region 206. Part of the light propagating while repeating the reflections at the end portion 25 of the waveguide 202 and the connection region 206 is coupled with the light present in the resonator 203, and then coupled with the light propagating in the waveguide 201 toward the input portion 207. The light propagating toward the input portion 207 is referred to as a reflected wave (third light) 210.

The reflected waves 208, 209 and 210 mutually interfere to become light propagating in the waveguide 201 toward the input portion 207 to return thereto. This light is not output to the output region 204 but returns to the input portion 207 to become a loss. In description below, light which is part of the input light entering from the input portion 207 and is not output to the output region 204 but returns to the input portion 207 to become a loss is referred to as returning light.

A coupling constant between the light present in the resonator 203 and the light propagating in the waveguide 201 is defined as a first coupling constant. A coupling constant between the light present in the resonator 203 and the light propagating in the waveguide 202 is defined as a second coupling constant. A ratio of the first coupling constant to the second coupling constant, in other words, a value obtained by dividing the first coupling constant by the second coupling constant is defined as a coupling constant ratio.

As described in Embodiment 1, control of respective phases of the reflected waves 208, 209 and 210 causes them to interfere with each other to cancel each other out, which enables suppression of the returning light. The present embodiment will show, as an example, a case where a length L21 (see FIG. 2) between the end portion 25 of the waveguide 202 and the connection region 206 is controlled so as to control the phase of the reflected wave 210 to reduce intensity of the returning light.

Figure 6:
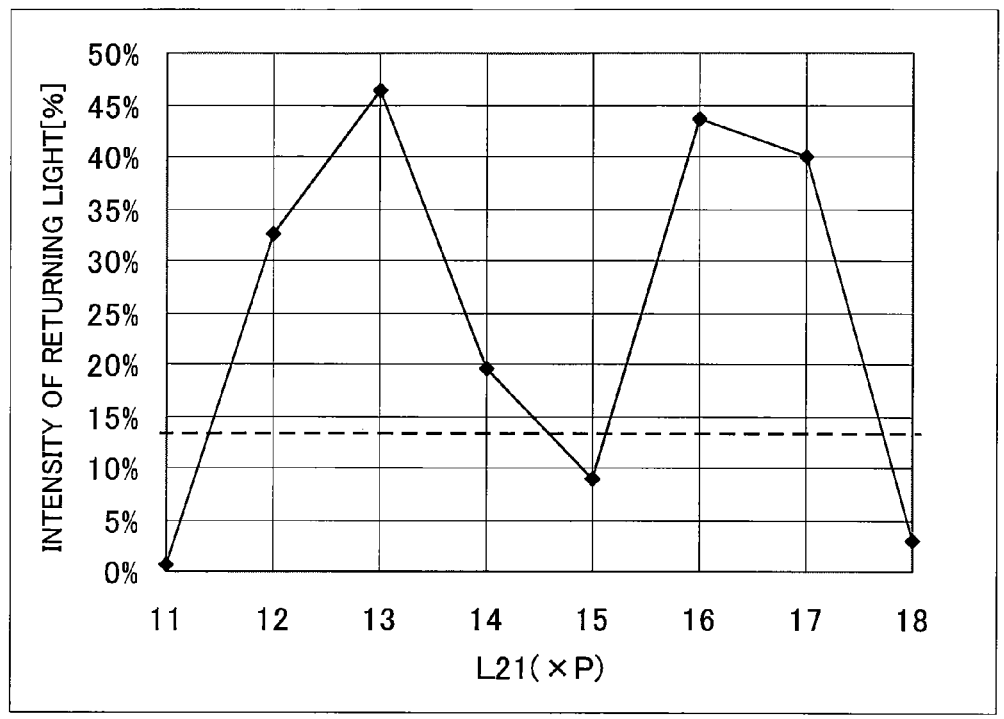
FIGS. 6 and 7 are graphs each showing a result of calculating intensity of returning light in Embodiment 2.

FIG. 6 is a graph showing a result of calculating the intensity of the returning light when the length L21 between the end portion 25 of the waveguide 202 and the connection region 206 is changed, the calculation being performed using the transfer matrix method. In the graph of FIG. 6, a horizontal axis indicates a normalized length L21 obtained by normalizing the length L21 between the end portion 25 of the waveguide 202 and the connection region 206 by the lattice period P, and a vertical axis indicates the intensity of the returning light when the intensity of the input light is 1.

Figure 12:
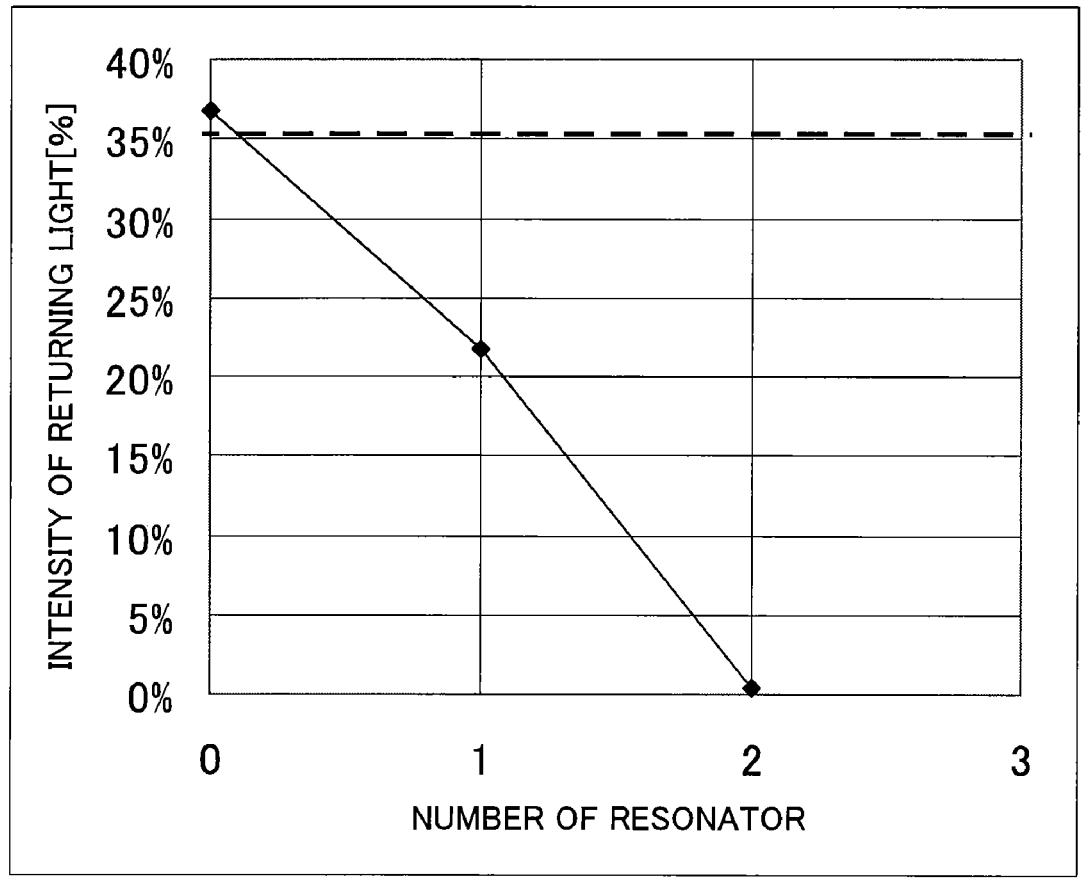
FIG. 12 is a graph showing a result of calculating intensity of returning light in Embodiment 4.

In FIG. 12, a length between a center of the point defect 23 forming the resonator 203 and the end portion 24 of the waveguide 201 in the z-axis direction is 1.1 P, and a length between the center of the point defect 23 and the end portion 25 of the waveguide 202 in the z-axis direction is 1.0 P.

In FIG. 6, a broken line indicates the intensity of the returning light when the waveguide 201 is connected to the output region 204 without providing the resonator 203.

When the resonator 203 is provided, controlling the length L21 between the end portion 25 of the waveguide 202 and the connection region 206 reduces the intensity of the returning light to a lower level than that shown by the broken line. Thus, controlling the length L21 between the end portion 25 of the waveguide 202 and the connection region 206 to control the phase of the reflected wave 210 can reduce the returning light as compared to the case where the resonator 203 is not provided.

As described above in Embodiment 1, setting the coupling constant ratio to an appropriate value other than 1 enables reduction of the intensity of the returning light. This Embodiment shows an example where the coupling constant ratio is smaller than 1.

Figure 7:
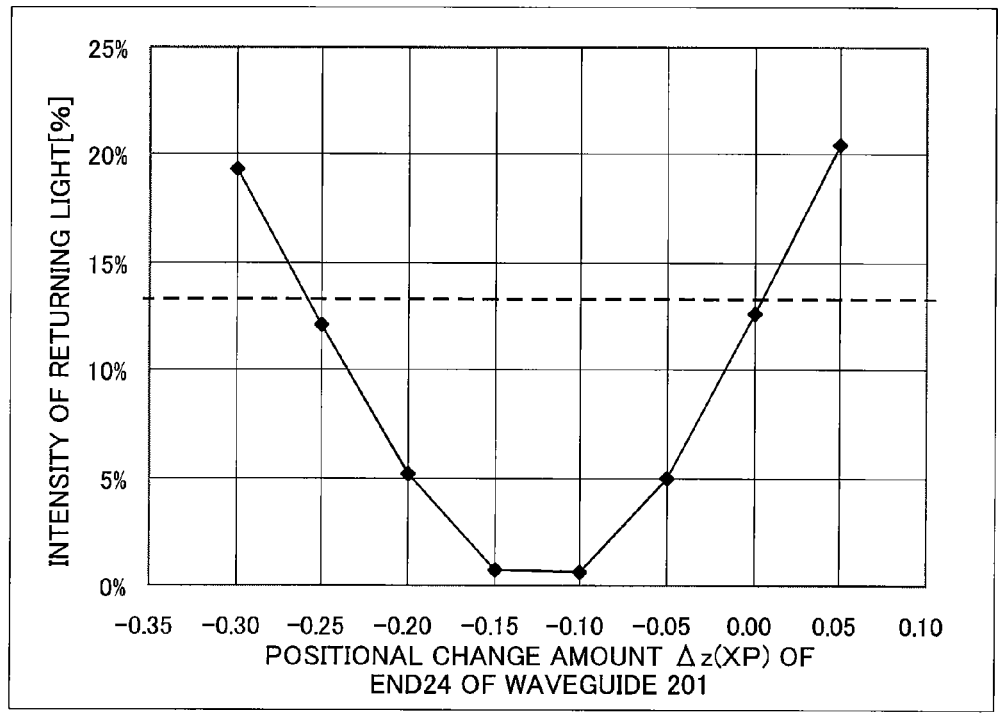

FIG. 7 is a graph showing a result of calculating the intensity of the returning light by using the transfer matrix method when a position of the end portion 24 of the waveguide 201 is changed in the z-axis direction in the three-dimensional structure B. A horizontal axis of the graph indicates a normalized change amount Δz obtained by normalizing a change amount of the position of the end portion 24 of the waveguide 201 by the lattice period P, while a vertical axis of the graph indicates the intensity of the returning light when the intensity of the input light is 1.

In FIG. 7, a length between a center of the point defect 23 forming the resonator 203 and the end portion 25 of the waveguide 202, which is normalized by the lattice period P, is 1.0 P, and a length L21 between the end portion 25 of the waveguide 202 and the connection region 206, which is normalized by the lattice period P, is 11.0 P.

Changing the position of the end portion 24 of the waveguide 201 in a +z direction strengthens the coupling of the light present in the resonator 203 with the light propagating in the waveguide 201. Thus, a value of the first coupling constant is increased and thereby a value of the coupling constant ratio is increased. On the other hand, changing the position of the end portion 24 of the waveguide 201 in a −z direction weakens the coupling of the light present in the resonator 203 with the light propagating in the waveguide 201. Thus, the value of the first coupling constant is reduced, and thereby the value of the coupling constant ratio is reduced.

When the position of the end portion 24 of the waveguide 201 is not changed, the first and second coupling constants are equal to each other, and therefore the coupling constant ratio is 1.

In FIG. 7, a broken line indicates the intensity of the returning light when the waveguide 201 is connected to the output region 204 without providing the resonator 203.

Changing the position of the end portion 24 of the waveguide 201 in the −z direction to change the length between the center of the point defect 23 of the resonator 203 and the end portion 24 in the z-axis direction reduces the intensity of the returning light to a lower level than that indicated by the broken line. In other words, changing the value of the first coupling constant to set the coupling constant ratio to a value other than 1 can reduce the returning light as compared to the case where the resonator 203 is not provided.

Further, adjusting the position of the end portion 24 of the waveguide 201 to set the coupling constant ratio to an appropriate value can significantly reduce the intensity of the returning light.

As described above, in the present embodiment, the resonator 203 is disposed at a position in the vicinity of the waveguides 201 and 202 where the light present in the resonator 203 is coupled with the light propagating in the waveguide 201 and the light propagating in the waveguide 202. Then, adjusting the length between the end portion 25 of the waveguide 202 and the connection region 206 to control the phase of the reflected wave 210 enables reduction of the intensity of the returning light.

Moreover, controlling the position of the end portion 24 of the waveguide 201 to adjust the value of the first coupling constant to set the coupling constant ratio to a value other than 1 enables reduction of the intensity of the returning light.

The reduction of the intensity of the returning light increases the intensity of the light propagating in the waveguide 202 toward the connection region 206, resulting in increase of intensity of light output to the output region 204. In other words, the coupling efficiency between the light propagating in the waveguide 201 in the guide mode 1 and the light propagating in the output region 204 in the guide mode 2 can be improved.

The description in this embodiment was made of the three-dimensional photonic crystal which has a woodpile structure including the additional layers. However, a waveguide may be formed by using a three-dimensional photonic crystal which has a woodpile structure including no additional layer. A waveguide may be formed by using a three-dimensional photonic crystal having a structure other than the woodpile structure.

The waveguide may be a straight waveguide or a curved waveguide.

Embodiment 3

Next, description will be made of a three-dimensional structure C which is a third embodiment of the present invention and includes an anti-reflection structure. The three-dimensional structure C is provided with a waveguide different from the waveguide 205 shown in FIG. 2.

Figure 8:
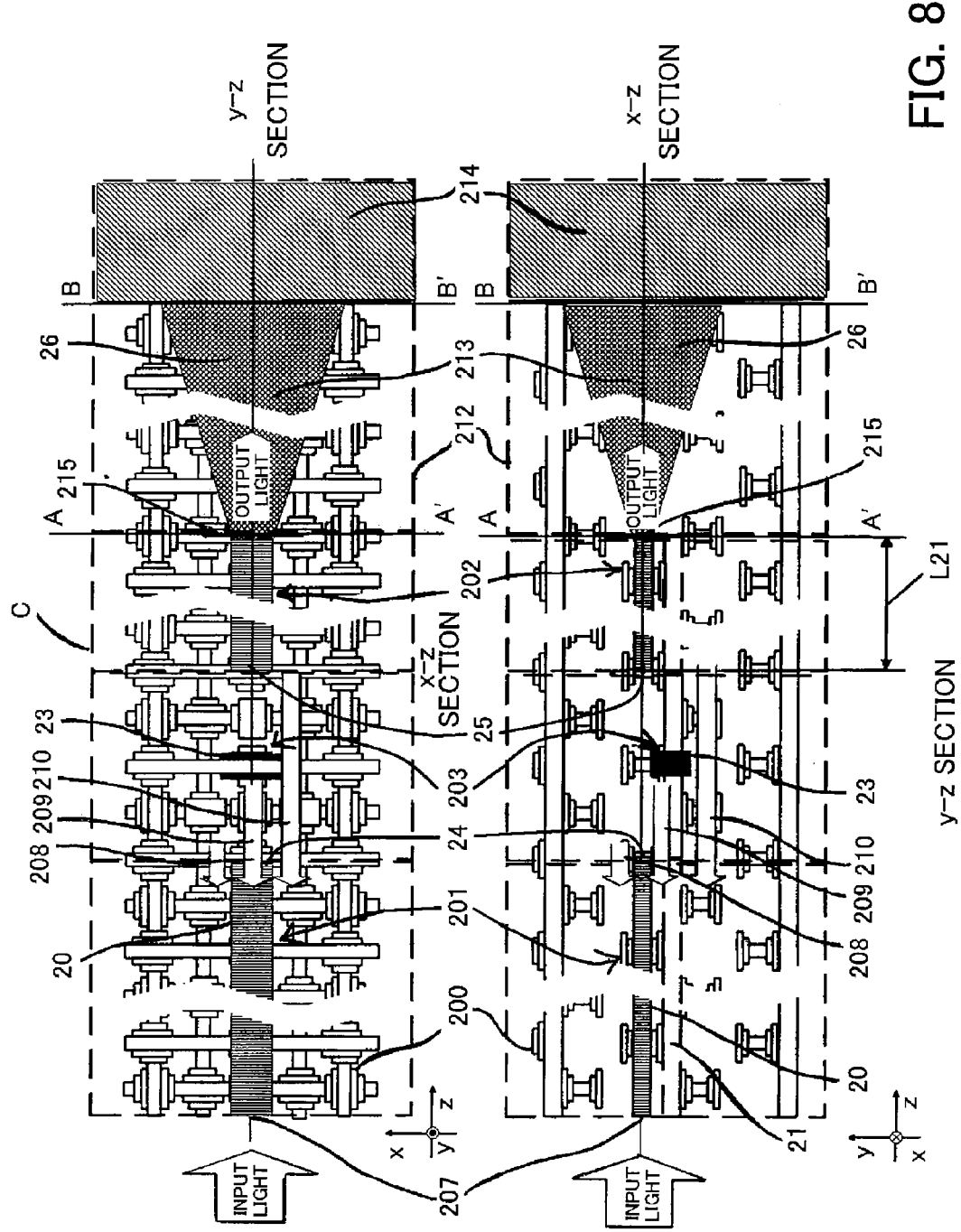
FIG. 8 shows a schematic configuration of a three-dimensional structure which is Embodiment 3 of the present invention.

FIG. 8 shows a schematic configuration of the three-dimensional structure C. The three-dimensional structure C includes a waveguide 201, a waveguide 202, and a resonator 203 in a photonic crystal 200. The photonic crystal 200, the waveguides 201 and 202, and the resonator 203 respectively have the same structures as those in Embodiment 2.

The three-dimensional structure C of the present embodiment further includes an output region 212. The output region 212 is a region including a waveguide 213 formed in the photonic crystal 200. The output region 202 includes a region 214 formed of a spatially homogeneous medium.

The waveguides 213 and the region 214 which are included in the output region 212 are connected to each other. The waveguide 202 and the waveguide 213 included in the output region 212 have structures different from each other, and are connected to each other via a connection region 215.

The waveguide 213 included in the output region 212 is provided by forming a tapered line defect 26 in the photonic crystal 200.

In FIG. 8, the line defect 26 has a tapered shape whose width and thickness gradually change in the x-y plane between a position indicated by the section AA' and a position indicated by the section BB'. The line defect 26 is formed of a medium having a refractive index (defect refractive index) equal to that of a medium of columnar structures included in the photonic crystal 200.

The waveguide 201 is connected with the waveguide 213 at the position of the section AA'. The center coordinate in the section of the line defect 20 forming the waveguide 201 orthogonal to an extending direction of the line defect 20 matches that in the section of the line defect 26 forming the waveguide 213 orthogonal to an extending direction of the line defect 26. The region 214 is connected with the waveguide 213 at the position of the section BB'.

Connecting the waveguide 201 to the waveguide 213 causes part of light propagating in the waveguide 201 in the guide mode 1 to be coupled with light propagating in the waveguide 213 in the guide mode 2, and the light coupled with the light propagating in the waveguide 213 propagates in the waveguide 213. The light propagating in the waveguide 213 is coupled with light propagating in a guide mode 3 in the region 214 connected with the waveguide 213 to be emitted to the region 214.

The guide mode pattern of the light propagating in the waveguide 213 is enlarged as it propagates from the section AA' to the section BB', and emitted to the region 214 at a spread angle according to a size of the guide mode pattern.

Appropriately designing the tapered line defect 26 enables emission of light having a desired spread angle and a desired intensity distribution to the region 214. Providing a structure including such a tapered line defect 26 at an end portion of the waveguide 202 in the photonic crystal 200 realizes a light-emitting device whose emission pattern is controlled. In addition, emitting the light to the region 214 with approximating the guide mode pattern of the photonic crystal 200 to a mode pattern of a fiber or a thin-line waveguide which is provided in the region 214 can improve the coupling efficiency between the photonic crystal 200 and the region 214.

Providing such a structure which controls the emission pattern (emission pattern control structure) at an end portion of a waveguide in a photonic crystal generates a reflected wave in a connection portion of the waveguide with the emission pattern control structure.

However, appropriately providing a resonator in the vicinity of the waveguide as described in the present embodiment can suppress a loss caused by such a reflected wave. Suppressing the loss caused by the reflected wave enables improvement of the coupling efficiency between the light propagating in the waveguide 201 in the guide mode 1 and the light propagating in the waveguide 213 in the guide mode 2.

In the present embodiment, light of a normalized frequency of 0.4947 enters the three-dimensional structure C from an input portion 207. In description below, light which is part of the input light entering from the input portion 207 to propagate in the waveguide 201 and is not output to the output region 212 but returns to the input portion 207 to become a loss is referred to as returning light.

Figure 9:
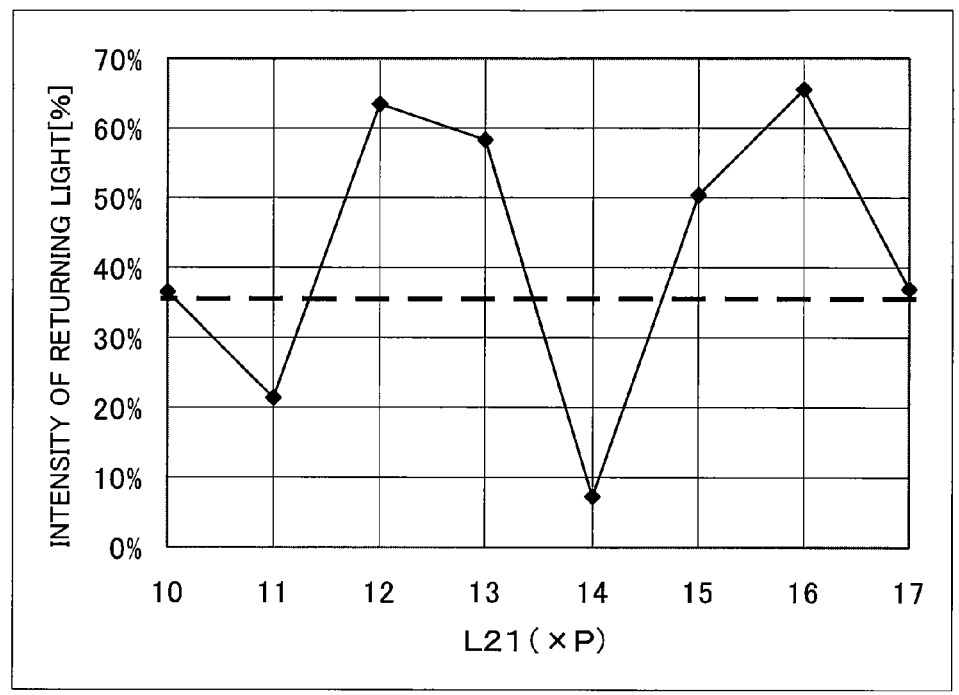
FIGS. 9 and 10 are graphs each showing a result of calculating intensity of returning light in Embodiment 3.

FIG. 9 is a graph showing a result of calculating intensity of the returning light when a length L21 (see FIG. 8) between an end portion 25 of the waveguide 202 and the connection region 215 is changed in the three-dimensional structure C, the calculation being performed using the transfer matrix method.

In FIG. 16, a length between a center of a point defect 23 forming the resonator 203 and an end portion 24 of the waveguide 201 in a z-axis direction is 1.15 P, and a length between the center of the point defect 23 and the end portion 25 of the waveguide 202 in the z-axis direction is 1.00 P. In the graph of FIG. 9, a horizontal axis indicates a normalized length L21 obtained by normalizing the length L21 between the end portion 25 of the waveguide 202 and the connection region 215 by the lattice period P, and a vertical axis indicates the intensity of the returning light when the intensity of the input light is 1. In FIG. 9, a broken line indicates the intensity of the returning light when the waveguide 201 is connected to the output region 212 without providing the resonator 203.

When the resonator 203 is provided, controlling the length L21 between the end portion 25 of the waveguide 202 and the connection region 215 reduces the intensity of the returning light to a lower level than that shown by the broken line. Thus, controlling the length L21 between the end portion 25 of the waveguide 202 and the connection region 215 to control the phase of the reflected wave 210 can reduce the returning light as compared to the case where the resonator 203 is not provided.

As described above in Embodiment 1, setting the coupling constant ratio to an appropriate value other than 1 enables reduction of the intensity of the returning light.

Figure 10:
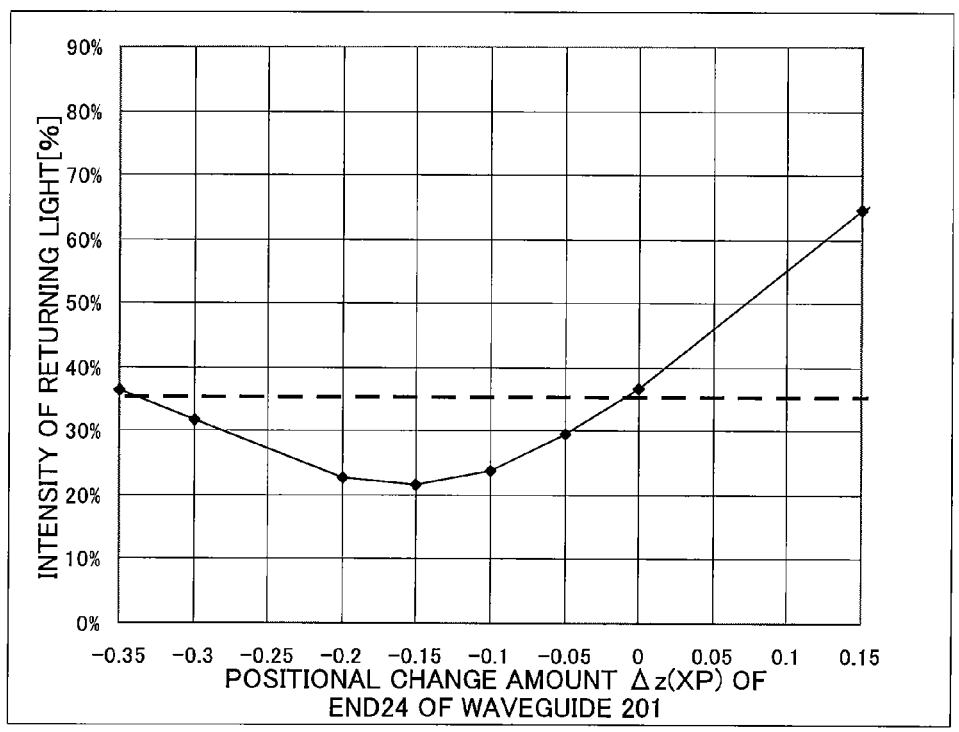

FIG. 10 is a graph showing a result of calculating the intensity of the returning light by using the transfer matrix method when a position of the end portion 24 of the waveguide 201 is changed in the z-axis direction in the three-dimensional structure C. A horizontal axis of the graph indicates a normalized change amount $\Delta z$ obtained by normalizing a change amount of the position of the end portion 24 of the waveguide 201 by the lattice period P, while a vertical axis of the graph indicates the intensity of the returning light when the intensity of the input light is 1. In FIG. 10, a broken line indicates the intensity of the returning light when the waveguide 201 is connected to the output region 212 without providing the resonator 203.

In FIG. 10, a length between the center of the point defect 23 forming the resonator 203 and the end portion 25 of the waveguide 202 in the z-axis direction, which is normalized by the lattice period P, is 1.0 P, and a length L21 between the end portion 25 of the waveguide 202 and the connection region 215, which is normalized by the lattice period P, is 11.0 P. Changing the position of the end portion 24 of the waveguide 201 in a +z direction strengthens the coupling of the light present in the resonator 203 with the light propagating in the waveguide 201. Thus, a value of the first coupling constant is increased and thereby a value of the coupling constant ratio is increased. On the other hand, changing the position of the end portion 24 of the waveguide 201 in a −z direction weakens the coupling of the light present in the resonator 203 with the light propagating in the waveguide 201. Thus, the value of the first coupling constant is reduced, and thereby the value of the coupling constant ratio is reduced.

When the position of the end portion 24 of the waveguide 201 is not changed, the first and second coupling constants are equal to each other, and therefore the coupling constant ratio is 1.

In FIG. 10, changing the position of the end portion 24 of the waveguide 201 in the −z direction reduces the intensity of the returning light to a lower level than that indicated by the broken line. In other words, changing the value of the first coupling constant to set the coupling constant ratio to a value other than 1 can reduce the returning light as compared to the case where the resonator 203 is not provided.

Further, adjusting the position of the end portion 24 of the waveguide 201 to set the coupling constant ratio to an appropriate value can significantly reduce the intensity of the returning light.

As described above, in the present embodiment, the resonator 203 is disposed at a position in the vicinity of the waveguides 201 and 202 where the light present in the resonator 203 is coupled with the light propagating in the waveguide 201 and the light propagating in the waveguide 202. Then, adjusting the length between the end portion 25 of the waveguide 202 and the connection region 215 to control the phase of the reflected wave 210 enables reduction of the intensity of the returning light.

Moreover, controlling the position of the end portion 24 of the waveguide 201 to adjust the value of the first coupling constant to set the coupling constant ratio to a value other than 1 enables reduction of the intensity of the returning light.

The reduction of the intensity of the returning light increases the intensity of the light propagating in the waveguide 202 toward the connection region 215, resulting in increase of intensity of light output to the output region 212. In other words, the coupling efficiency between the light propagating in the waveguide 201 in the guide mode 1 and the light propagating in the output region 212 in the guide mode 2 can be improved.

As described above, the structure included in the output region in the three-dimensional structure may be a structure other than a waveguide formed by providing a line defect in the photonic crystal, or a structure in which a tapered line defect is provided in the photonic crystal. Further, the structure included in the output region may be a waveguide formed by providing in the photonic crystal a line defect extending in a direction different from that of a waveguide extending from the input portion to the connection portion.

Moreover, the structure included in the output region may be a structure having no three-dimensional structure, or may be a region formed by spatially homogeneously providing a medium such as air. Furthermore, the structure included in the output region may include a thin line waveguide or a planar waveguide.

In addition, appropriately designing the resonator and the waveguide which are provided in the three-dimensional structure depending on the structure of the output region enables suppression of the returning light. Suppressing the returning light to increase the intensity of the light output to the output region enables improvement of the coupling efficiency between the light propagating in the waveguide and the light propagating in the output region.

Embodiment 4

Embodiments 1 to 3 described the case where one resonator is provided. However, plural resonators may be provided, which can further reduce the intensity of the returning light.

Figure 11:
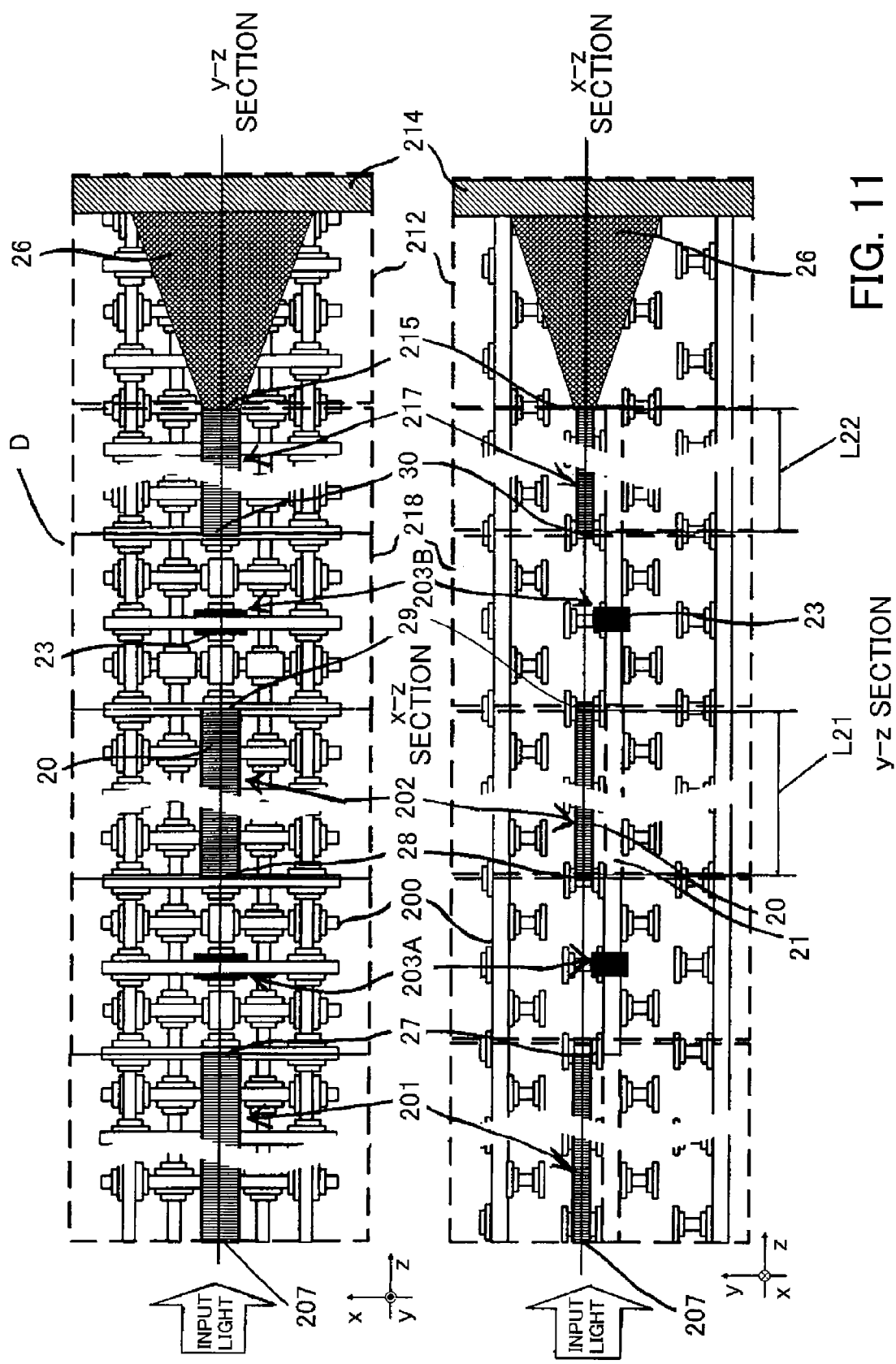
FIG. 11 shows a schematic configuration of a three-dimensional structure which is Embodiment 4 of the present invention.

FIG. 11 shows a schematic configuration of a three-dimensional structure D which is a fourth embodiment (Embodiment 4) of the present invention.

The three-dimensional structure D corresponds to a structure where another resonator 203 is added to the three-dimensional structure C of Embodiment 3.

The three-dimensional structure D includes a waveguide 201, a waveguide 202, a waveguide 217, an output region 212, a resonator 203A, and a resonator 203B in a photonic crystal 200. The waveguide 217 has the same structure as those of the waveguides 201 and 202 in Embodiment 3. The resonators 203A and 203B have the same structure as that of the resonator 203 in Embodiment 3.

The output region 212 is the same as that shown in FIG. 9 in Embodiment 3.

The waveguide 201 includes an input portion 207 and an end portion 27, and the waveguide 202 includes an end portion 28 and an end portion 29. The waveguide 217 includes an end portion 30, and is connected to a connection region 215 at an end portion opposed to the end portion 30. The resonator 203A is provided between the end portion 27 of the waveguide 201 and the end portion 28 of the waveguide 202. The resonator 203B is provided between the end portion 29 of the waveguide 202 and the end portion 30 of the waveguide 217.

The resonator 203A is disposed such that at least part of light present in the resonator 203A is coupled with light propagating in the waveguide 201 and light propagating in the waveguide 202. The resonator 203B is disposed such that at least part of light present in the resonator 203B is coupled with the light propagating in the waveguide 202 and light propagating in the waveguide 217.

In description below, light which is part of input light entering from the input portion 207 to propagate in the waveguide 201 and is not output to the output region 212 but returns to the input portion 207 to become a loss is referred to as returning light.

FIG. 12 is a graph showing a result of calculating intensity of the returning light when the input light enters from the input portion 207, the calculation being performed using the transfer matrix method.

In the present embodiment, a length L22 of the waveguide 217 between the end portion 30 thereof and the connection region 215, which is normalized by the lattice period P, is 11.0 P, and a length L21 between the end portion 28 of the waveguide 202 and the end portion 29 of the waveguide 202, which is normalized by the lattice period P, is 11.0 P. These values are needed to reduce the returning light further than the above-described embodiments.

Further, in the present embodiment, a length between the end portion 27 of the waveguide 201 and the resonator 203A in a z-axis direction is 1.15 P, and a length between the end portion 28 of the waveguide 202 and the resonator 203A in the z-axis direction is 1.00 P. Moreover, a length between the end portion 29 of the waveguide 202 and the resonator 203B in the z-axis direction is 1.15 P, and a length between the end portion 30 of the waveguide 217 and the resonator 203B in the z-axis direction is 1.00 P.

FIG. 12 is a graph showing a relationship between the number of the resonators (horizontal axis) and the intensity of the returning light (vertical axis). In FIG. 12, a broken line indicates the intensity of the returning light when no resonator is provided.

As shown in FIG. 12, the intensity of the returning light is further reduced when the number of the resonators is two than when the number of the resonators is one. In other words, providing plural resonators enables further reduction of the intensity of the returning light. Providing the plural resonators enables reduction of a change in intensity of the returning light with respect to changes in shape of the resonator, a refractive index of a medium forming the resonator, and a positional relationship between the resonator and the end portion of the waveguide. That is, providing the plural resonators enables reduction of an influence of manufacturing errors, thereby facilitating manufacturing of a three-dimensional structure including an anti-reflection structure.

As described above, according to Embodiments 2 to 4, one or a plurality of resonators is provided in the vicinity of the waveguide in the three-dimensional structure to control the phase of the light propagating in the waveguide, thereby suppressing a reflected wave generated at the connection region connecting the structures in which the lights propagate in the guide modes different from each other. Thus, the coupling efficiency of light between the structures can be improved.

Further, according to Embodiments 2 to 4, the coupling constant (at least one of the first and second coupling constants) between the light present in the resonator and the light propagating in the waveguide is controlled to suppress the reflected wave generated at the connection region of the structures in which the lights propagate in the guide modes different from each other. Thus, the coupling efficiency of light between the structures in which the lights propagate in the guide modes different from each other can be improved.

According to Embodiments 2 to 4, the length of the waveguide provided between the resonator and the connection region is changed to control the phase of the light propagating in the waveguide, and the distance (length) between the resonator and the end portion of the waveguide is changed to control the coupling constant between the light present in the resonator and the light propagating in the waveguide. Thus, generation of the reflected wave can be suppressed to improve the coupling efficiency.

The waveguides provided in the photonic crystal are not limited to those shown in Embodiments 2 to 4. For example, a waveguide may be employed where one of the columnar structures forming the photonic crystal is formed of a medium having a refractive index lower than that of a medium forming the other columnar structures such that the one columnar structure serves as a line defect.

Methods for controlling the phase of the light propagating in the waveguide are not limited to the above-described ones. The phase may be controlled by changing the shape of the resonator. The phase may be controlled by changing the medium forming the resonator. Further, the phase may be controlled by changing the length of the waveguide provided between the resonator and the connection region and the shape or the medium of the resonator.

Methods for controlling the coupling constant ratio may be methods other than that for changing the positional relationship between the resonator and the end portion of the waveguide provided between the input portion and the resonator. For example, the coupling constant ratio may be controlled by changing the shape of the resonator, the medium forming the resonator, or the positional relationship between the resonator and the end portion of the waveguide provided between the resonator and the connection region.

Embodiment 5

A light-emitting device including an anti-reflection structure, which is a fifth embodiment (Embodiment 5) of the present invention, will be described. The light-emitting device F of the present invention includes any one of the three-dimensional structures described in Embodiments 1 to 4.

The light-emitting device F includes a resonator formed by a point defect. Appropriately selecting a shape and a medium of the point defect can cause the resonator to function as a resonator having a resonance mode at a specific frequency in a complete photonic band gap. In the resonator, a gain medium whose emission spectrum contains a resonance wavelength is disposed. Supplying energy to the gain medium with an electromagnetic wave or an electric current from the outside causes the gain medium to emit light, which realizes a light-emitting device with high efficiency such as a laser or an LED.

When, in the vicinity of the resonator (hereinafter referred to as "light-emitting resonator"), a waveguide is provided which causes light to propagate therein in a guide mode corresponding to a resonance mode frequency of the light-emitting resonator, light generated in the light-emitting resonator is coupled with the light propagating in the waveguide to be extracted to the outside of the light-emitting resonator. The extracted light propagates in the waveguide.

Figure 13:
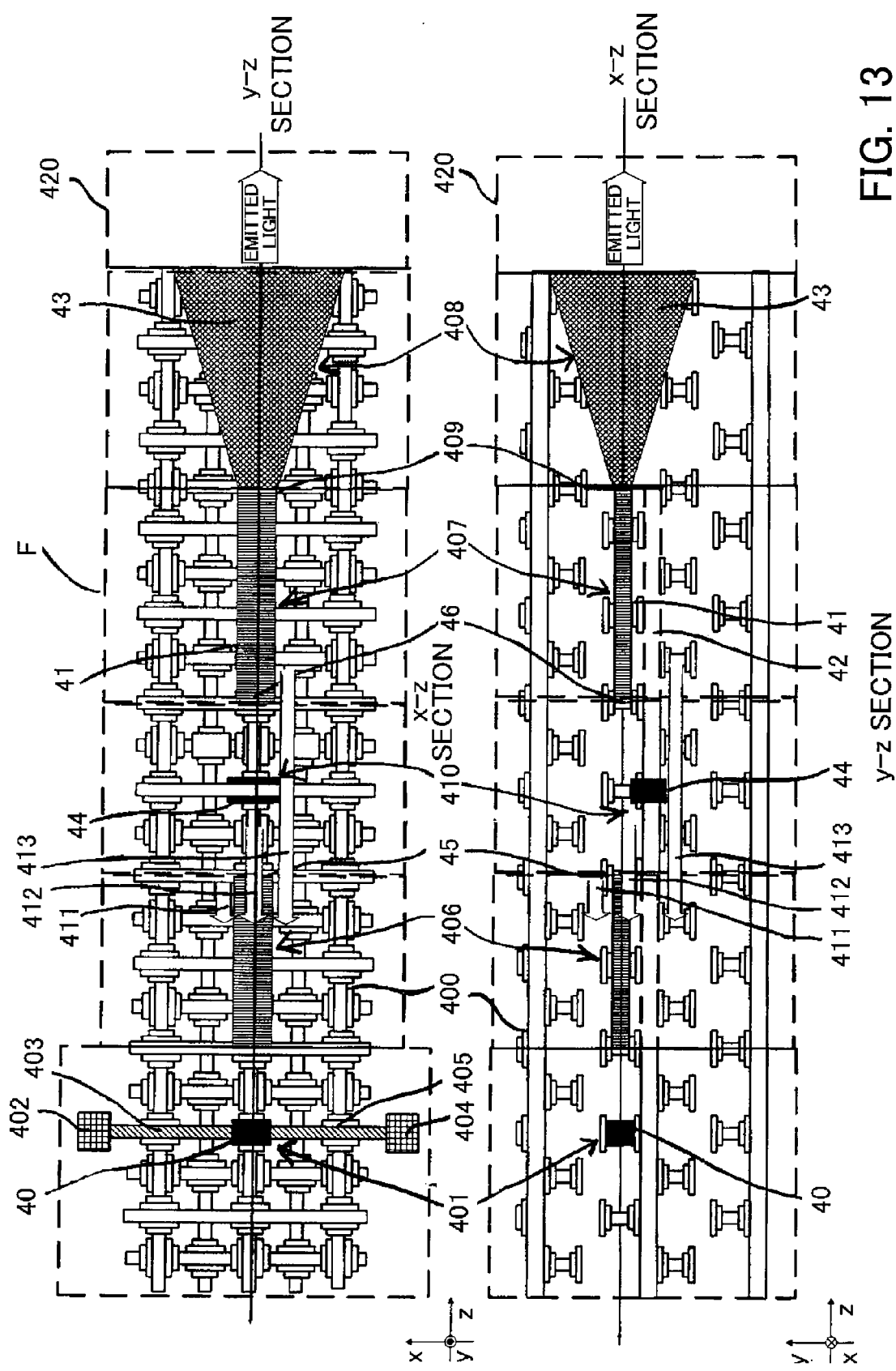
FIG. 13 is a schematic view showing a structure of a light-emitting device which is Embodiment 6 of the present invention.

FIG. 13 shows a schematic configuration of the light-emitting device F of the present embodiment. The upper and lower sides of FIG. 13 respectively show an x-z section and a y-z section of the light-emitting device F.

The light-emitting device F includes a light-emitting resonator 401 formed by providing a point defect 40 in a photonic crystal 400, a p-type electrode 402, a p-type carrier conducting pathway 403, an n-type electrode 404, and an n-type carrier conducting pathway 405. In the light-emitting resonator 401, a gain medium (active medium) is disposed which receives carriers to be excited and thereby emits light.

Holes are supplied to the light-emitting resonator 401 through the p-type electrode 402 and the p-type carrier conducting pathway 403, and electrons are supplied to the light-emitting resonator 401 through the n-type electrode 404 and the n-type carrier conducting pathway 405. The holes and the electrons are coupled together in the light-emitting resonator 401 to emit light, thereby performing laser oscillation.

In order to extract the light to the outside of the light-emitting resonator 401, a waveguide 406 and a waveguide 407 are provided in the light-emitting device F. Each of the waveguides 406 and 407 is formed by a first line defect 41 formed of a medium having a refractive index equal to that of a medium forming columnar structures in the photonic crystal 400, and a second line defect 42 formed in a layer different from a layer in which the first line defect 41 is formed.

Each of the waveguides 406 and 407 causes light to propagate therein in a specific guide mode corresponding to a resonance mode frequency of the light-emitting resonator 401. Disposing the waveguide 406 at an appropriate position with respect to the light-emitting resonator 401 enables efficient conversion of light present in the light-emitting resonator 401 in a resonance mode into light propagating in the waveguide 406 in the specific guide mode.

At an end portion of the waveguide 407, a mode conversion structure is provided for emitting light with an arbitrary guide mode pattern to the outside of the photonic crystal 400. In the present embodiment, as an example of the mode conversion structure, a tapered waveguide 408 is provided which is formed by a tapered line defect 43. The tapered waveguide 408 is a waveguide in which a sectional area in a section orthogonal to a direction in which the waveguide 408 extends gradually changes (increases or decreases) in the direction in which the waveguide 408 extends. The tapered waveguide 408 is connected with the waveguide 407 at a connection region 409.

The tapered waveguide 408 is connected with a free space (second region) 420 which is formed outside the photonic crystal. The second region is a region formed of a medium such as air and having a homogeneous refractive index distribution.

The tapered waveguide 408 is capable of converting the guide mode pattern of the light propagating in the waveguide 407 into a guide mode pattern having a monomodal intensity distribution in a section orthogonal to a direction in which the tapered waveguide 408 extends and a size corresponding to the tapered shape of the tapered waveguide 408. Connecting the tapered waveguide 408 with the end portion of the waveguide 407 enables control of the guide mode pattern of the light propagating in the waveguides 407 and 408 and extraction of the light from the photonic crystal 400 to the outside thereof.

Thus, providing the light-emitting resonator 401 which is a point defect, the waveguide 407 and the mode conversion structure (tapered waveguide 408) in the photonic crystal 400 having the complete photonic band gap can realize a light-emitting device. In such a light-emitting device, a reflected wave is generated at the connection region 409 between the waveguide 407 and the mode conversion structure (tapered waveguide 408), or at a connection region between the mode conversion structure and the free space outside the photonic crystal 400. The generated reflected wave is not emitted to the outside of the photonic crystal 400, but propagates in the waveguide in an opposite direction to the connection region to become a loss.

Therefore, in the present embodiment, an anti-reflection structure is provided in the light-emitting device. The waveguide (first waveguide) 406 has an end portion 45 in the photonic crystal 400, and the waveguide (second waveguide) 407 has an end portion 46 in the photonic crystal 400. A resonator 410 is provided between the end portion 45 of the waveguide 406 and the end portion 46 of the waveguide 407.

The resonator 410 is formed by providing a point defect 44 in the photonic crystal 400. The resonator 410 is disposed such that at least part of light present in the resonator 410 is coupled with light propagating in the waveguide 406 and light propagating in the waveguide 407.

A coupling constant between the light present in the resonator 410 and the light propagating in the waveguide 406 is defined as a first coupling constant. A coupling constant between the light present in the resonator 410 and the light propagating in the waveguide 407 is defined as a second coupling constant. A ratio of the first coupling constant to the second coupling constant, in other words, a value obtained by dividing the first coupling constant by the second coupling constant is defined as a coupling constant ratio.

When the light propagating in the waveguide 406 reaches the end portion 45 thereof, its guide mode pattern is disturbed. When the end portion 45 disturbs the guide mode pattern of the light propagating in the waveguide 406, part of that light is coupled with light propagating in the waveguide 406 toward the light-emitting resonator 401. That is, part of the light propagating in the waveguide 406 toward the resonator 410 is reflected by the end portion 45 of the waveguide 406. The light reflected by the end portion 45 of the waveguide 406 is referred to as a reflected wave (first light) 411.

Part of the light propagating in the waveguide 406 is coupled with the light present in the resonator 410. Part of the light coupled with the light present in the resonator 410 is coupled again with the light propagating in the waveguide 406 toward the light-emitting resonator 401 to become a reflected wave. This reflected wave is referred to as a reflected wave (second light) 412.

Further, part of the light coupled with the light present in the resonator 410 is coupled with the light propagating in the waveguide 407 to propagate in the waveguide 407 toward the connection region 409. This light is reflected by the connection region 409 or the connection region between the tapered waveguide 408 and the free space 420, and then is multiply-reflected between the end portion 46 of the waveguide 407 and the connection region 409. Part of the multiply-reflected light is coupled with the light present in the resonator 410 and then is coupled with the light propagating in the waveguide 406 toward the light-emitting resonator 401 to become a reflected wave. This reflected wave is referred to as a reflected wave (third light) 413.

The reflected waves 411, 412 and 413 mutually interfere to become returning light propagating in the waveguide 406 toward the light-emitting resonator 401. The returning light is not extracted to the outside of the photonic crystal 400 to become a loss.

As in each of the above-described embodiments, appropriately setting a shape, a position and a medium of the resonator 410 and a length between the end portion 46 of the waveguide 407 and the connection region 409 enables control of a phase of each reflected wave to reduce intensity of the returning light.

Further, controlling at least one of the first coupling constant between the light present in the resonator 410 and the light propagating in the waveguide 406 and the second coupling constant between the light present in the resonator 410 and the light propagating in the waveguide 407 sets the coupling constant ratio to a value other than 1, which makes it possible to reduce the intensity of the returning light. The first and second coupling constant can be controlled by controlling the shape, position and medium of the resonator 410, a positional relationship between the end portion 45 of the waveguide 406 and the resonator 410, and a positional relationship between the end portion 46 of the waveguide 407 and the resonator 410.

Reducing the intensity of the returning light increases intensity of the light propagating in the waveguide 406 toward the connection region 409, thereby increasing intensity of light which is output to the free space 420. In other words, the coupling efficiency between the light propagating in the waveguide 406 and the light propagating in the free space 420 can be improved.

As described above, in the present embodiment, the point defect resonator (light-emitting resonator) and the waveguide are provided in the photonic crystal. Further, the tapered waveguide (mode conversion structure) is provided at the end portion of the waveguide. Thereby, a light-emitting device that emits light to the outside of the photonic crystal while converting the guide mode pattern can be obtained.

In such a light-emitting device, providing the anti-reflection structure in the waveguide enables suppression of generation of the reflected waves at the end portion of the tapered waveguide or the connection region between the waveguide and the tapered waveguide. This can realize a high-performance light-emitting device with a reduced loss and a controlled guide mode pattern of emitted light.

As described above, in the three-dimensional structure of each embodiment, when the first and second waveguides provided in the photonic crystal are connected to the first region where the light propagating in a guide mode different from that in the first and second waveguides, the reflected wave generated at the connection region can be reduced. This makes it possible to improve the coupling efficiency between the light propagating in the first guide mode and the light propagating in the second guide mode. Further, using such a three-dimensional structure can realize a light-emitting device with high luminous efficiency.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2008-065648, filed on Mar. 14, 2008, which is hereby incorporated by reference herein in its entirety.

What is claimed is:

1. A three-dimensional structure constituted with a three-dimensional photonic crystal, comprising:
   a first waveguide and a second waveguide which are respectively formed by providing line defects in the three-dimensional photonic crystal;
   a resonator which is formed by providing a point defect in the three-dimensional photonic crystal; and
   a first region which causes light to propagate in a guide mode different from a guide mode in which the first and second waveguides cause light to propagate therein,
   wherein:
   the first waveguide includes an input portion into which light enters;
   the first and second waveguides cause the light to propagate therein in a first guide mode;
   the second waveguide and the first region are connected with each other such that at least part of the light propagating in the second waveguide is coupled with the light propagating in the first region; and
   the resonator is provided such that at least part of light present in the resonator is coupled with the light propagating in each of the first and second waveguides,
   wherein, when, of the light propagating in the first waveguide toward the resonator, light which is reflected at a connection portion of the first waveguide and the resonator is defined as first light, light which is coupled with the light present in the resonator and then coupled again with the light propagating in the first waveguide is defined as second light, and light which is coupled with the light present in the resonator, then coupled with the light propagating in the second waveguide, then coupled again with the light present in the resonator, and then coupled with the light propagating in the first waveguide is defined as third light,
   the resonator and the first and second waveguides are formed such that intensity of the first light and intensity of the second light are different from each other; and
   wherein the resonator and the first and second waveguides are formed so as to satisfy the following condition:

$-1 \leq \cos(\phi) < 0$ where $\phi$ represents a phase difference between one of the first light and the second light whose intensity is higher than that of the other, and the third light.

2. A three-dimensional structure according to claim 1, wherein, when a coupling constant between the light present in the resonator and the light propagating in the first waveguide is defined as a first coupling constant, a coupling constant between the light present in the resonator and the light propagating in the second waveguide is defined as a second coupling constant, and a value obtained by dividing the first coupling constant by the second coupling constant is defined as a coupling constant ratio, the coupling constant ratio is a value other than 1.

3. A three-dimensional structure according to claim 2, wherein the coupling constant ratio is a value lower than 1.

4. A light-emitting device comprising:
(A) a three-dimensional structure constituted with a three-dimensional photonic crystal, the three-dimensional structure including:
   a first waveguide and a second waveguide which are respectively formed by providing line defects in the three-dimensional photonic crystal;
   a resonator which is formed by providing a point defect in the three-dimensional photonic crystal; and
   a first region which causes light to propagate in a guide mode different from a guide mode in which the first and second waveguides cause light to propagate therein,
   wherein:
   the first waveguide includes an input portion into which light enters;
   the first and second waveguides cause the light to propagate therein in a first guide mode;
   the second waveguide and the first region are connected with each other such that at least part of the light propagating in the second waveguide is coupled with the light propagating in the first region; and
   the resonator is provided such that at least part of light present in the resonator is coupled with the light propagating in each of the first and second waveguides,
   wherein, when, of the light propagating in the first waveguide toward the resonator, light which is reflected at a connection portion of the first waveguide and the resonator is defined as first light, light which is coupled with the light present in the resonator and then coupled again with the light propagating in the first waveguide is defined as second light, and light which is coupled with the light present in the resonator, then coupled with the light propagating in the second waveguide, then coupled again with the light present in the resonator, and then coupled with the light propagating in the first waveguide is defined as third light,
   the resonator and the first and second waveguides are formed such that intensity of the first light and intensity of the second light are different from each other; and
   wherein the resonator and the first and second waveguides are formed so as to satisfy the following condition:

$-1 \leq \cos(\phi) < 0$ where $\phi$ represents a phase difference between one of the first light and the second light whose intensity is higher than that of the other, and the third light,
(B) a light-emitting resonator including a gain medium and disposed in the three-dimensional photonic crystal; and
(C) a second region disposed outside the three-dimensional photonic crystal,
   wherein the light-emitting resonator and the first waveguide in the three-dimensional structure are disposed such that at least part of light present in the light-emitting resonator is coupled with the light propagating in the first waveguide,
   wherein the first region and the second region are disposed such that at least part of the light propagating in the first region is coupled with light propagating in the second region in a guide mode different from the second guide mode, and
   wherein light generated in the light-emitting resonator by exciting the gain medium propagates in the first waveguide, the resonator, the second waveguide and the first region to be emitted to the second region.

* * * * *